United States Patent
Baker et al.

(10) Patent No.: US 10,198,856 B2
(45) Date of Patent: Feb. 5, 2019

(54) METHOD AND SYSTEM OF ANTI-ALIASING SHADING DECOUPLED FROM RASTERIZATION

(71) Applicant: Oxide Interactive, LLC, Towson, MD (US)

(72) Inventors: Daniel Kurt Baker, Towson, MD (US); Timothy James Kipp, Fallston, MD (US)

(73) Assignee: Oxide Interactive, LLC, Towson, MD (US)

( * ) Notice: Subject to any disclaimer, the term of this patent is extended or adjusted under 35 U.S.C. 154(b) by 114 days.

(21) Appl. No.: 14/076,604

(22) Filed: Nov. 11, 2013

(65) Prior Publication Data
US 2015/0130805 A1    May 14, 2015

(51) Int. Cl.
*G06T 15/50* (2011.01)
*G06T 15/80* (2011.01)

(52) U.S. Cl.
CPC .......... *G06T 15/80* (2013.01); *G06T 2200/12* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 5,793,374 A * | 8/1998 | Guenter | ................. | G06T 15/80 345/426 |
| 6,353,437 B1 * | 3/2002 | Gagne | ..................... | G06T 13/00 345/473 |
| 6,441,816 B1 * | 8/2002 | Nguyen | ................. | G06T 15/04 345/420 |
| 7,170,515 B1 * | 1/2007 | Zhu | ........................ | G06T 15/005 345/422 |
| 8,228,337 B1 * | 7/2012 | Khodakovsky | ....... | G06T 15/005 345/422 |
| 8,395,629 B1 * | 3/2013 | Kilpatrick | ................ | G06T 9/00 345/426 |
| 8,508,550 B1 * | 8/2013 | Jenny | ..................... | G06T 11/60 345/419 |
| 8,638,331 B1 * | 1/2014 | Jarosz | .................... | G06T 15/06 345/426 |
| 2003/0001838 A1 * | 1/2003 | Han | ...................... | G06T 15/205 345/419 |

(Continued)

OTHER PUBLICATIONS

Cook et al., The Reyes Image Rendering Architecture, Jul. 1987, ACM Computer Graphics, vol. 21, No. 4, pp. 95-102.*

(Continued)

*Primary Examiner* — Anh-Tuan V Nguyen
(74) *Attorney, Agent, or Firm* — Nixon Peabody LLP (57) ABSTRACT

A method and system for rendering a graphic object is disclosed. The method includes selecting a set of points of a graphic object for shading. At least one shading parameter is determined for application to the selected set of points of the graphic object. A shading parameter image is precalculated based on the determined at least one shading parameter. The shading parameter image is stored in a memory. The selected points are shaded using the shading parameter image to produce a shaded graphic object image via a graphic processor. The shaded graphic object image is rasterized into a frame image.

23 Claims, 5 Drawing Sheets

(56) References Cited

U.S. PATENT DOCUMENTS

| | | | |
|---|---|---|---|
| 2003/0117403 A1* | 6/2003 | Park | G06T 15/005 345/503 |
| 2004/0012600 A1* | 1/2004 | Deering | G06T 15/005 345/506 |
| 2004/0012603 A1* | 1/2004 | Pfister | G06T 15/08 345/582 |
| 2005/0174346 A1* | 8/2005 | Park | G06T 15/04 345/422 |
| 2005/0206657 A1* | 9/2005 | Arcas | G01C 21/36 345/660 |
| 2006/0028469 A1* | 2/2006 | Engel | G06T 15/08 345/426 |
| 2007/0002066 A1* | 1/2007 | Whitted | G06T 15/005 345/582 |
| 2007/0024620 A1* | 2/2007 | Muller-Fischer | G06T 17/20 345/427 |
| 2007/0097123 A1* | 5/2007 | Loop | G06T 11/203 345/442 |
| 2007/0216676 A1* | 9/2007 | Lee | G06T 15/205 345/419 |
| 2007/0252841 A1* | 11/2007 | Kim | G06T 15/40 345/522 |
| 2008/0074415 A1* | 3/2008 | Woo | G06T 15/005 345/419 |
| 2008/0074430 A1* | 3/2008 | Jiao | G06T 15/005 345/506 |
| 2008/0238919 A1* | 10/2008 | Pack | G06T 15/04 345/420 |
| 2008/0238942 A1* | 10/2008 | Sun | G06T 11/60 345/634 |
| 2009/0189897 A1* | 7/2009 | Abbas | G06T 15/005 345/426 |
| 2009/0256845 A1* | 10/2009 | Sevastianov | G06T 15/40 345/426 |
| 2010/0085360 A1* | 4/2010 | Ren | G06T 15/50 345/426 |
| 2010/0188404 A1* | 7/2010 | Tong | G06T 11/40 345/426 |
| 2011/0080519 A1* | 4/2011 | Chowdhry | H04N 19/115 348/453 |
| 2011/0090224 A1* | 4/2011 | Woo | G06T 15/005 345/426 |
| 2011/0102440 A1* | 5/2011 | Yuen | G06T 15/005 345/428 |
| 2011/0148919 A1* | 6/2011 | Heggelund | G06T 15/005 345/629 |
| 2011/0242119 A1* | 10/2011 | Bolz | G06T 15/005 345/522 |
| 2011/0285747 A1* | 11/2011 | Kilgard | G06T 11/203 345/613 |
| 2012/0092366 A1* | 4/2012 | Smithers | G06T 11/001 345/629 |
| 2012/0147007 A1* | 6/2012 | Woo | G06T 15/00 345/426 |
| 2012/0229445 A1* | 9/2012 | Jenkins | G06T 15/40 345/418 |
| 2013/0155103 A1* | 6/2013 | Kakarlapudi | G09G 5/377 345/629 |
| 2013/0265309 A1* | 10/2013 | Goel | G06T 15/80 345/426 |
| 2013/0271465 A1* | 10/2013 | Clarberg | G06T 15/005 345/426 |
| 2013/0328857 A1* | 12/2013 | Burley | G06T 15/06 345/418 |
| 2013/0342547 A1* | 12/2013 | Lum | G06T 15/005 345/505 |
| 2014/0112536 A1* | 4/2014 | Ely | G06T 7/0026 382/103 |
| 2014/0132613 A1* | 5/2014 | Lassen | G06T 15/005 345/522 |
| 2014/0176549 A1* | 6/2014 | Uralsky | G06T 15/005 345/426 |
| 2014/0327684 A1* | 11/2014 | Engh-Halstvedt | G06T 1/20 345/506 |
| 2014/0354637 A1* | 12/2014 | Reiner | G06T 17/10 345/420 |

OTHER PUBLICATIONS

Burns et al., A Lazy Object-Space Shading Architecture with Decoupled Sampling, 2010, Conference on High Performance Graphics, pp. 19-28.*

Sabino et al., A Hybrid GPU Rasterized and Ray Traced Rendering Pipeline for Real Time Rendering of per Pixel Effects, 2012, International Conference on Entertainment Computing, pp. 292-305.*

Pfister et al., Surfels: Surface Elements as Rendering Primitives, 2000, ACM Proceedings of the 27th Annual Conference on Computer Graphics and Interactive Techniques, pp. 335-342.*

* cited by examiner

METHOD AND SYSTEM OF ANTI-ALIASING SHADING DECOUPLED FROM RASTERIZATION

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to rendering graphics, and more particularly, to a method of decoupling shading points of an object from rasterizing the object for rendering on a display.

BACKGROUND

With increased hardware processing capability, sophisticated video graphics are increasingly possible in applications such as video streaming or video gaming. In a typical hardware system that supports graphics, applications are executed by a conventional central processing unit (CPU), which may require calls for rendering graphic objects on a display. In order to efficiently process the display of such graphics, specialized processors termed graphic processing units (GPU) have been employed to render graphics. A GPU is a specialized processing circuit designed to rapidly manipulate and alter memory to accelerate the creation of images in a frame buffer intended for output to a display. Typical GPUs perform various graphic processing functions by performing calculations related to 3D graphics. These include accelerating memory-intensive work such as texture mapping and rendering polygons, and performing geometric calculations such as the rotation and translation of vertices into different coordinate systems. GPUs may also support programmable shaders, which can manipulate vertices and textures, oversampling and interpolation techniques to reduce aliasing, and provide very high-precision color spaces.

Currently, applications such as state-of-the-art video games require high resolution and detailed graphics presented in real-time. In real-time graphics, shading is a method of taking a desired graphic object, which is usually a collection of triangles formed from vertices and textures, then rendering the object onto an image by assigning shading to the triangles of the object, resulting in a colored image for a video frame. Most video games perform shading by employing either forward rendering or deferred rendering methods.

In forward rendering, each object is drawn one by one. The triangles of the objects are processed and then drawn onto the screen in the order they were submitted. For each pixel element of the triangle, a pixel program (or fragment program) is executed, which evaluates the color for that pixel on the screen. The image created is an approximate color value of what will be presented to the user, resembling in format and style a computer representation of a photograph.

In deferred rendering, rather than each object rendering a color into an image, shading parameters are rendered into a deep image that is a series of images that may contain more data than just a color. Shading parameters might include factors such as a normal direction, an albedo color, or a specular color and power. Once the deep image is created, another series of shader programs operates on the deep image and transforms it into an image. This approach decouples shading from rasterization, shading the final image buffer based on the shading parameters.

Both of these known approaches have drawbacks. Forward rendering may make local shading evaluation more computationally expensive, since small localized effects might need to be applied to large areas of a scene. Deferred renders are notorious for the ability to have a limited number of materials and suffer intrinsic limitations in regards to anti-aliasing. Both approaches also suffer from shader aliasing. Shader aliasing renders artifacts (mistakes) made because the shader program has logic that can alias. This can be partially explained mathematically by realizing that while equation (1) should be used to perform shading operations (or an approximation thereof), in fact equation (2) is used.

$$\mathrm{Color}(P) = \int^R S(\mathrm{ShadeInputs}(t))dt \qquad (1)$$

$$\mathrm{Color}(P) = S(\int^R \mathrm{ShadeInputs}(t)dt) \qquad (2)$$

In these equations, the Color is the resulting color, P is the pixel on the screen, S is the shading program, the "ShadeInputs" are the input parameters for the shading program, and R is the region of mesh that maps to the P. These equations are only equivalent when the program S is linear, a property that few shading programs have.

Further, in both forward and deferred renders, the parameters for shading are calculated every frame via rasterizing the shading inputs. The parameter results are locked into textures by using texture coordinates that are interpolated from vertices of the triangle. This is usually done by determining the equivalent barycentric coordinates of the center point of each pixel the triangle covers. Because the vertices of the triangle do not map directly to the center of a pixel, for each frame the barycentric coordinates may vary by a small value, even though the pixels that are covered by the triangle remain the same. This means there is very little cohesion from frame to frame of the exact shading inputs used and therefore may produce wildly different results causing aliasing effects. This may also cause undesirable artifacts to be displayed.

Thus, there is a need for a more efficient method to render graphic objects that separates shading from rasterization. There is a further need for a rendering method that allows objects to be efficiently filtered for different sizing. There is further need for a rendering method that may be used to provide frames of objects with minimal aliasing. There is a further need for a rendering method incorporating precalculated shading data to cause blurring effects in a produced frame.

SUMMARY

According to one example, a method for generating a graphic display by decoupling shading from rasterization in a graphic processing system is displayed. A set of points of a graphic object are selected for shading. At least one shading parameter for application to the selected set of points is determined. A shading parameter image is precalculated based on the determined at least one shading parameter. The shading parameter image is stored in a memory. The selected points are shaded using the shading parameter image to produce a shaded graphic object image via a graphic processor. The shaded graphic object image is rasterized into a frame image.

Another example is a graphic rendering system for decoupling shading from rasterization of a graphics object. The system includes a memory storing a graphic object including a set of points and a graphic processor coupled to the memory. The graphic processor executes a graphics rendering engine operable to determine at least one shading parameter for application to the selected set of points of the graphic object. The graphics rendering engine precalculates a shading parameter image based on the determined at least one shading parameter. The graphic rendering engine stores the shading parameter image in the memory. A call is received for the graphic object. The selected points are shaded using the shading parameter image to produce a shaded graphic object image. The shaded graphic object image is rasterized into a frame image.

Another example is a non-transitory, machine readable medium having stored thereon instructions for rendering a graphic object for display. The stored instructions comprise machine executable code, which when executed by at least one machine processor, causes the machine processor to determine at least one shading parameter for application to a selected set of points of the graphic object. The instructions cause the machine processor to precalculate a shading parameter image based on the determined at least one shading parameter and store the shading parameter image in a memory. The instructions cause the machine processor to receive a call for the graphic object and shade the selected points using the shading parameter image to produce a shaded graphic object image. The instructions cause the machine processor to rasterize the shaded graphic object image into a frame image.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
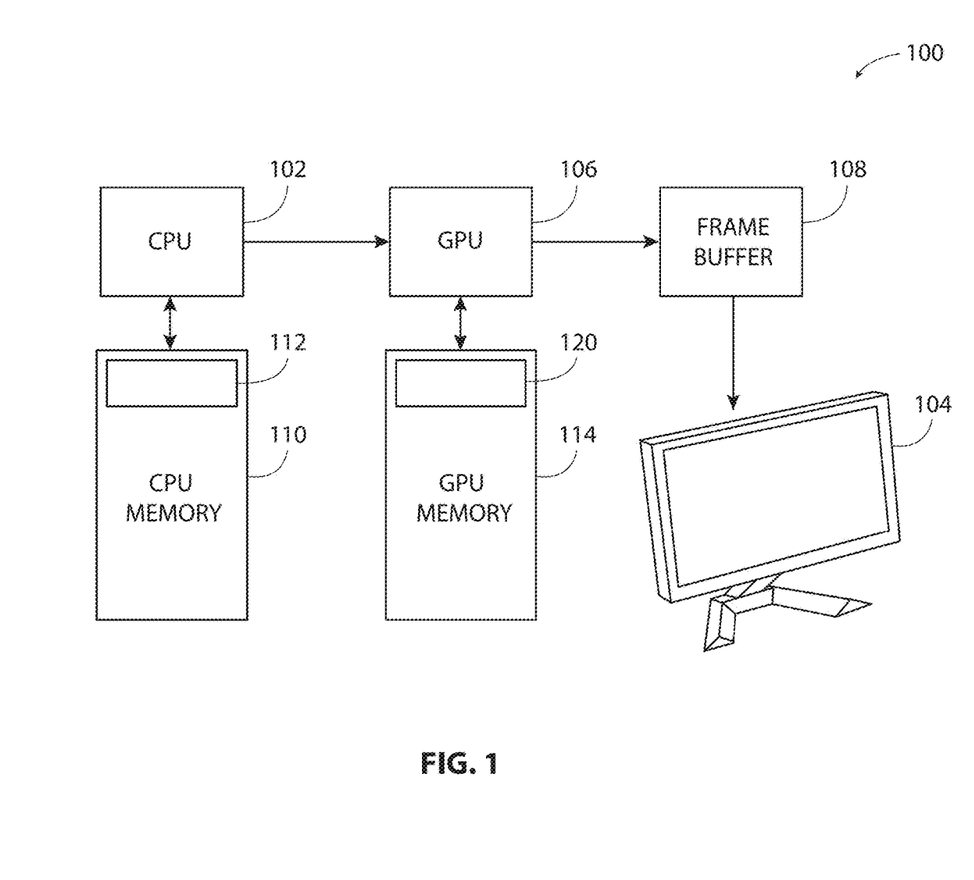
FIG. 1 is a block diagram of a processing system including a graphics rendering engine that may employ the example decoupled process to render graphics on a display.

FIG. 1 shows an example graphic based processing system 100 that includes a game engine executing on a central processing unit (CPU) 102. As is generally understood, the game engine calls graphics that are displayed on a display 104. The graphics of the game engine are processed by a graphic processing unit (GPU) 106 and rendered in scenes stored on a frame buffer 108 that is coupled to the display 104. Although, the example in FIG. 1 is directed toward video gaming systems, it is to be understood that the principles explained herein are applicable to any application requiring real-time or high-speed graphics processing. The CPU 102 has an associated CPU memory 110 and the GPU 106 has an associated video or GPU memory 114. Although shown as a separate element in FIG. 1, the frame buffer 108 may be an allocated area of the video memory 114.

As will be explained below, the GPU 106 renders graphic objects on the display 104 in response to requests by the central processing unit 102, which executes an example game engine 112 stored on the CPU memory 110. The graphic processing unit (GPU) 106 is coupled to the GPU or video memory 114. The GPU 106 executes a graphics rendering engine 120 stored on the GPU memory 114. The graphics rendering engine 120 renders graphic objects by decoupling shading from the rasterization process, and executes anti-aliasing, arbitrary shader programs. The graphics rendering engine 120 captures the shading parameters into a texture. The graphics rendering engine 120 shades a graphic object using these captured shading parameters and rasterizes the object onto an image, using motion blur as will be explained below.

Instead of using forward rendering or deferred rendering, an object space shading system is used by the graphics rendering engine 120, which either evaluates the color for a point of a graphic object from Equation 1 below or facilitates its approximation.

$$\text{Color}(P) = \int^R S(\text{ShadInputs}(t))dt \qquad (1)$$

In this equation, the Color (P) is the resulting color, P is the pixel on the screen, S is the shading program run by the processing system 100, the "ShadeInputs" are the input parameters for the shading program, and R is the region of mesh that maps to the pixel on the screen, P.

In the approach used by the graphics rendering engine 120 in this example, the concept of a deferred renderer is reversed resulting in shading graphic objects first and then rasterizing them. That is, the graphics rendering engine evaluates the samples inside Equation 1 and then performs the integration to produce the color for each pixel.

To facilitate the evaluation of this equation, the graphics rendering engine 120 precalculates a set of shader inputs, or shading parameters for each graphic object. The shader parameters are formatted for efficiency of the graphic processing hardware such as the GPU 106. A series of material shaders are executed by the GPU 106 in the shading process, each of which takes the precalculated shading parameters and calculates a color for the object. During the shading process, a series of material shader programs specified for each object executes on the shade inputs, and then stores the output into a color into a texture on the video memory 114.

This image then contains the shaded linear color values for an object at the frame of interest. The object may then be rasterized onto the display 104 when the object is called to be displayed by evaluating the integral in Equation 1 at this time. Because this integration is approximated by a linear summation, the processing system 100 uses native hardware samplers to perform the operation. In addition to shader aliasing, temporal aliasing or motion blurring is performed by re-rendering the shading data multiple times for the intermediate frames.

The GPU 106 executes three major components of the graphics rendering engine 120. The first component employs a process of selecting or calculating a set of points of a graphic object to be rendered for shading. At least one shading parameter is determined for application to the selected set of points. The shading parameter may be based on textures, object geometry, position, weathering, etc. A shading parameter image is precalculated based on the shading parameter. Multiple shading parameters may be selected for an object and corresponding shading parameter images may be precalculated for each parameter. The resulting shading parameter images are stored for the object in the video memory 114. The process may be performed as often as required should an object's basic shading properties change.

The second component employs a process for shading each sample point of an object into a texture and thereby filtering them using the shading parameter images from the first component. Thus the selected points of the graphic object are shaded using the shaded parameter image to produce a shaded graphic object image. The third component employs a process of rasterizing the shaded samples onto a color frame image, rendering it multiple times to perform anti-aliasing and motion blur. The resulting inter-frame renders are blended to produce a blended frame image for display.

Figure 2:
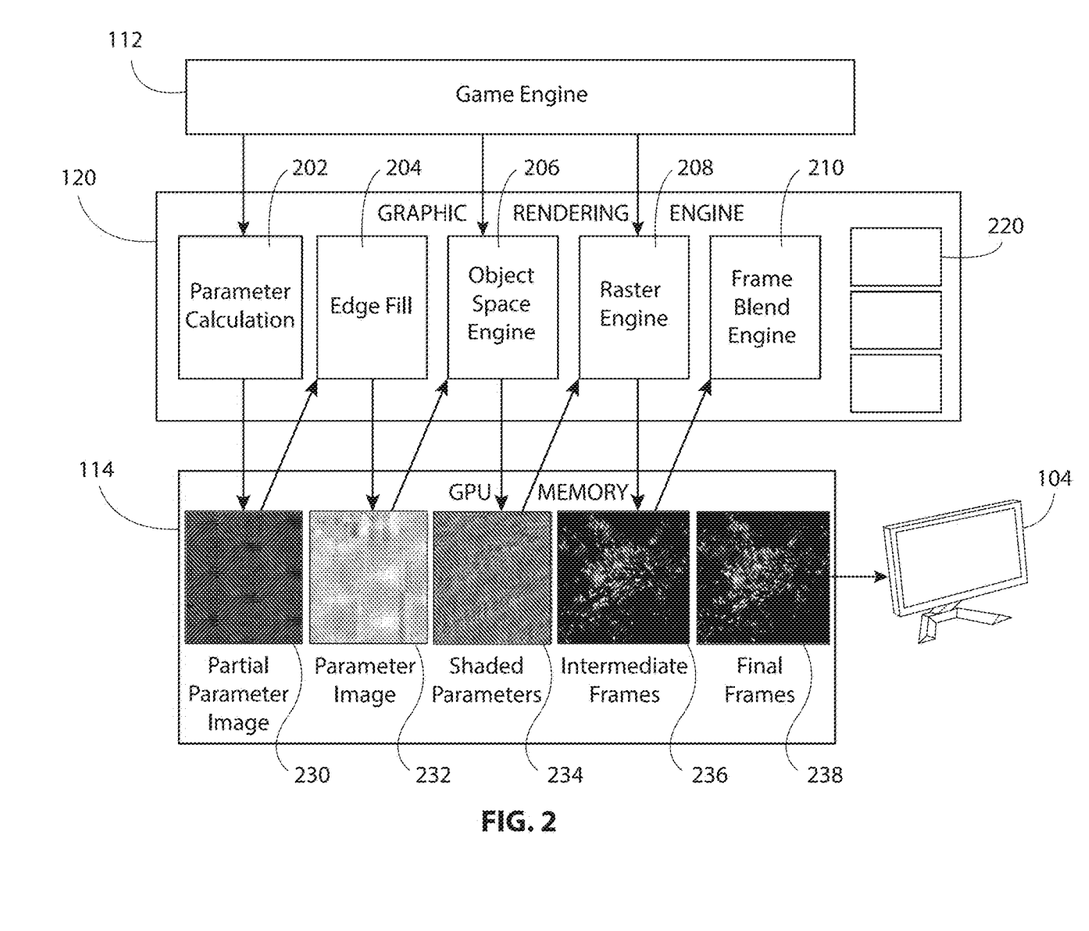
FIG. 2 is a block diagram of the components of the graphic rendering engine in FIG. 1.

FIG. 2 is a block diagram of the components of the graphics rendering engine 120 in relation to data stored on the GPU memory 114. The game engine 112 requests different objects to be rendered on the display 104 based on the game dynamics. The graphics rendering engine 120 includes a parameter calculation module 202, an edge fill module 204, an object space engine 206, a raster engine 208 and a frame blend engine 210. A series of material shader programs 220 are used by the object space engine 206 to color an object for rendering. FIG. 2 also shows the video memory 114, which stores data used by the components of the graphics rendering engine 120. The game engine 112 generates calls for object data, which is a mesh including points such as triangles and vertices. The video memory 114 stores intermediate parameter images 230, which are generated by the parameter calculation module 202 and accessed by the edge fill module 204. Parameter images 232 are therefore created by the edge fill module 204 for each graphic object and are stored in the video memory 114.

When the game engine 112 calls for the rendering of an object, the associated parameter images 232 to the called object are accessed by the object space engine 206. The object space engine 206 uses various material shader programs 220 to shade the called graphic object resulting in a shaded parameter image 234. The raster engine 208 creates intermediate frames 236 from the shaded parameter image 234. The resulting intermediate frames 236 are then combined by the frame blend engine 210 to produce a final frame 238, which is stored in a frame buffer area of the video memory 114 and displayed on the video display 104.

Figure 3:
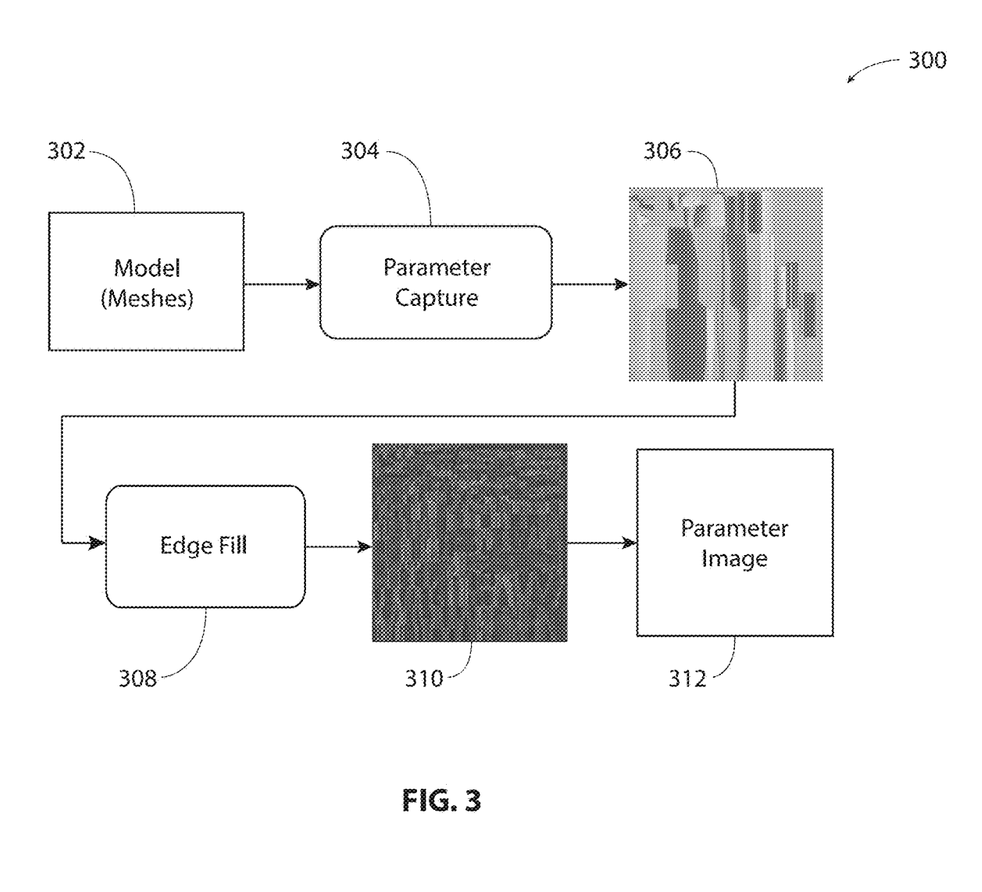
FIG. 3 is a flow diagram showing the process of selecting shading parameters for a graphic object performed by the graphics rendering engine in FIG. 1.

FIG. 3 is a block diagram with resulting data showing the process of selecting the set of points of the graphic object to be shaded and determining appropriate shading parameter images for the graphic object. In this example, when the graphic objects are loaded with the game engine 112 in the processing system 100, the process in FIG. 3 is performed to produce associated shading parameter images for all graphic objects that could be called by the game engine 112. The precalculated shading process may also be employed if a graphic object changes in the course of executing the game engine 112.

The flow diagram in FIG. 3 represents the first component of the graphics rendering engine 120, which is performed by the parameter calculation module 202 and the edge fill module 204 as shown in FIG. 2. As shown in FIG. 3, the process first reads a graphic object 302 from the game engine 112. The graphic object 302 is a model or mesh of the object that includes triangles and vertices. The process then performs a parameter capture operation 304 to determine the shading parameters to be associated with the object. As will be explained below, the parameter capture operation 304 selects different points associated with the graphic object to be shaded and the associated shading parameter for the selected points. An intermediate parameter image 306 is produced for each of the associated shading parameters of the object. The process then performs an edge fill 308 to produce a parameter image 310. The resulting output is a series of parameter images 312 associated with the graphic object.

As explained above, the process in FIG. 3 calculates the shading parameters associated with a graphic object into a GPU efficient format, using the graphics rendering engine 120 running on the GPU 106 in FIG. 1. Rather than using the rasterization (and rules) for every frame to calculate the shading inputs, rasterization is employed to calculate shaded samples only when an object's properties require it. The calculation of shading inputs is done as frequently or infrequently as required. The decoupled rasterization of the shaded samples is locked to specific sizes and projections, thereby creating a consistent set of shading inputs across frames. Thus, each frame evaluates the same inputs as all other frames thereby minimizing shader aliasing due to temporal variance of the shaded sample points.

A typical shading system requires a variety of inputs to shade the points in an object. Typically, these properties come from different sources. Some properties, like an object's color or material type, often come from a texture created by an artist. Other properties, such as position, are generated by the geometry of an object. For example, the geometry of a graphic object is typically in the form of vertices and triangles. The geometry may also come from more complex surfaces, such as subdivision surfaces. Other examples of parameters include weathering effects, color, normal, position, ambient occlusion, directional occlusion, roughness, or any other parameter commonly used for a BRDF (Bidirectional Reflectance Distribution Function). The graphics rendering engine 120 of the processing system 100 has access to shading parameters created by an artist in the form of the texture data provided by the game engine 112 and stored in the video memory 114. Additional images from the geometry are created that match the same parameterization as the properties provided by the artist. The additional resulting parameter images are stored in video memory 114 and associated with the object. This results in all geometry based shader parameters living inside textures and no shading information will come from the actual geometry of the object.

For this process, each object or asset has a set of 2-dimensional texture coordinates for every vertex, which map to a unique place in a texture. Each triangle of an object is rasterized into a series of images using the 2D texture coordinates. Rather than rasterize the color of an object, the parameters needed for shading are rasterized. For example, the position in object space will be rasterized and a normal in world space will also be rasterized if these are the two associated parameter images with the object.

This process creates a series of intermediate parameter images such as the intermediate parameter image 306 in FIG. 3. Each of the intermediate parameter images 306 includes a parameter from the geometry that may be used for shading. The process performs the edge fill 308 via additional processing by the graphics rendering engine 120 to remove edge artifacts from the intermediate images 306 and create levels of detail for an object. The result is the parameter image 310.

The process in FIG. 3 is based on the premise that most objects such as the graphic model 302, when unwrapped with a unique texture, have seams. The seams are analogous to creating an article of clothing from fabric. However, because the seams are part of the production of the model, they should not be visible when the object is rendered. Due both to the fact texture sampling rules differ from rasterization rules and sampling occurs at lower resolution, MIP maps, without special processing artifacts, become apparent at the seams because there may be enough samples for the final compositing.

To solve the appearance of seams, a series of edge fill operations are performed by the graphics rendering engine 120 directing the GPU 106 to produce an intermediate parameter image 306 captured into a texture. The colors in the intermediate parameter image 306 represent different normal directions. The grey space between colors represents gutters for which shading samples are not present. However, this grey area sample may get inadvertently touched during reconstruction. Each edge fill operation performed during the edge fill operation 308 looks at any non-filled sample patterns and gives it an average value of its neighbors. Thus, each time the edge fill operation is run, the boundary is extended by one pixel.

Once the edge fill operation 308 is complete, reduced sized images may be calculated from the largest image thereby building a series of smaller textures so that the number of shading samples may be chosen. This allows the graphics rendering engine 120 to choose from a discrete set of textures to adjust the number of shaded samples. Unlike MIP mapping, there is no special restriction that each image be exactly half the dimensions of the previous image. Shading parameters for materials may change based on overall roughness. That is, if the surface geometry has a great deal of roughness in it, it will affect the shading if those sample points are aggregated. To accommodate this, a denormalized normal is allowed in the process, whose value is used by the shader programs to adjust the shading accordingly. For example, the Tokvsig factor may be used to adjust BRDF parameters to accommodate shading changes resulting from a broadening distribution of normals, since this denormalization is directly related to the distribution of normals.

Once the shading parameter images 312 such as the shading parameter image 310 in FIG. 3 are produced, the associated graphic object may be shaded and rendered on the display 104 in FIG. 1 when the object is required. In this example, the shading parameter images are stored for use when the associated graphic object is called by the game engine 112. When a graphic object is called, a shading process 402 occurs and the object is rendered 404 as shown in the flow diagram in FIG. 4. In the process in FIG. 4, a command is issued to the graphics rendering engine 120 to shade a graphic object such as the graphic object 302 in FIG. 3.

The selected graphic object 302 is given a unique tag, or ID, chosen by the caller of the object, to reference the shaded object from the video memory 114 in FIG. 2. The shading process 402 may begin to occur immediately once the command calling the graphic object has been issued. The unique ID will be used by the graphics rendering engine 120 to render the object on the scene shown on the display 104 as will be explained below.

Using the captured parameter data in FIG. 3, each graphic object such as the graphic objects 410, 412, 414, and 416, also known as assets, now has a set of shading parameters such as shading parameter images 420, 422, and 424. Each of the parameter images 420, 422, and 424 include different shading parameters that are packed into the shading parameter image and are generated similarly to how the parameter image 312 generated by the process in FIG. 3. In this example, the shading parameter image 420 is the position, the shading parameter image 422 is a normal and the shading parameter image 424 is an ambient occlusion. Of course other shading parameter images associated with other shading parameters such as geometry, color, weatherization effects, surface roughness, directional occlusion, Fresnel or any other BRDF parameter, may be associated with a graphic object.

Figure 4:
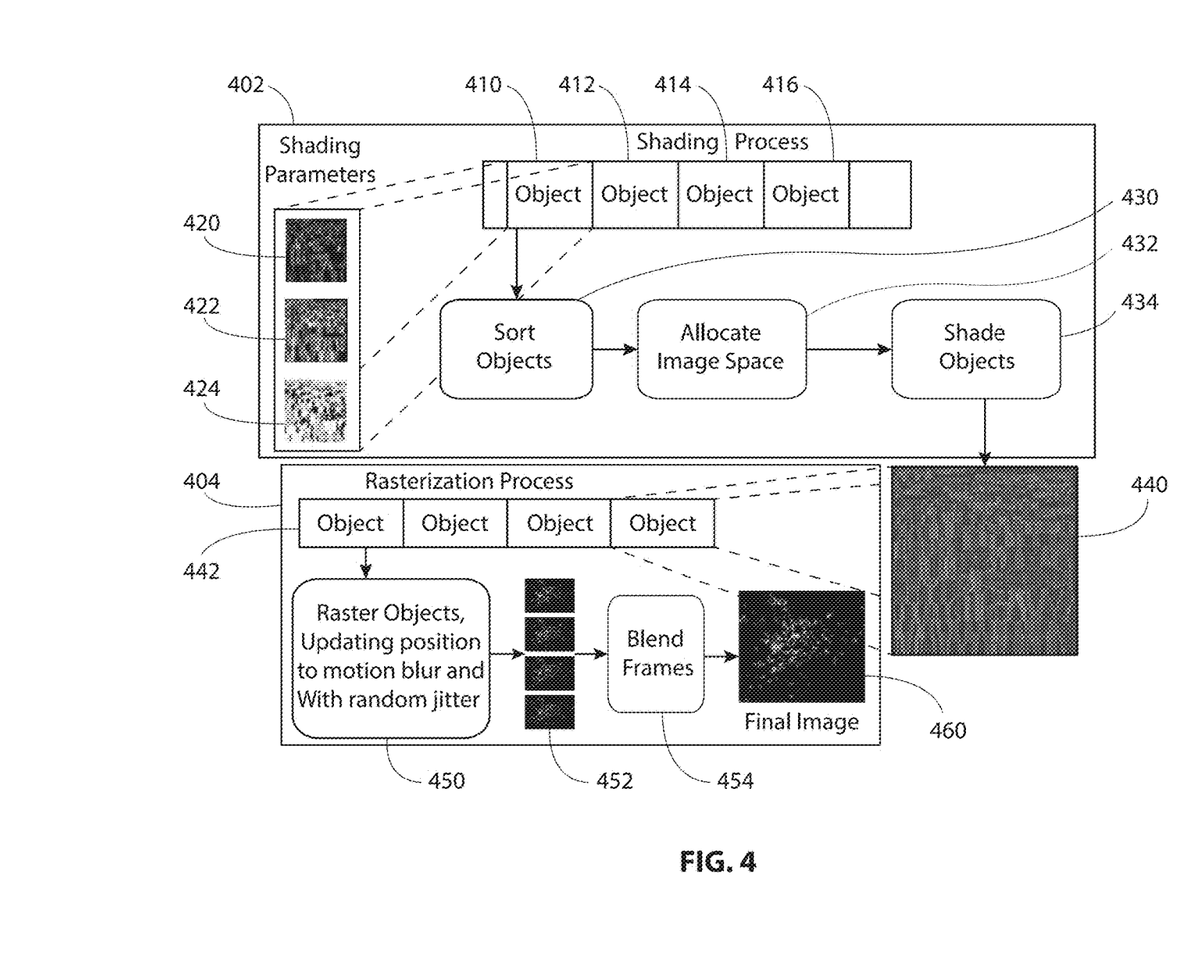
FIG. 4 is a flow diagram showing the process of shading and rasterization performed by the graphic rendering engine in FIG. 1 to generate a final image.

The process in FIG. 4 uses the object space engine 206 in FIG. 2 to sort the graphic objects (430) and allocate image space for the objects (432) in the video memory 114. The object space engine 206 projects a bounding box for the object into screen space, and the area of the bounding box in pixels is calculated. This is termed the estimated pixel coverage. The object space engine 206 then reserves area in the video memory 114 for the graphic object.

An object may appear smaller or bigger on the screen based on the position of the camera and the object. Because it is not feasible to shade all of the sample points of an object if it is very far away, it is necessary to select a reasonable number of shading samples to achieve reasonable performance. For example, a car far away in the distance may represent only a couple of hundred pixels in the final image, though the car object itself may have millions of possible shading samples. It is not feasible to evaluate every shading sample, nor desirable since they would not alter the resulting image very much. Thus, the processing system 100 selects the number of samples, and which samples, are needed for evaluation of the object based on the needs of the game engine 112.

To perform shading, a ratio of shaded sample points per pixel is defined for each pixel on the rendered image. This ratio is termed the shading ratio. If more than one sample for every pixel is shaded, the pixel is overshaded, and if less than one sample per pixel is shaded, the pixel is undershaded.

Each object may have its own shading ratio, which may be specified by an artist or a programmer, and may be adjusted globally across the system to regulate performance by the gaming engine 112. Using this ratio, the number of shading samples to use is calculated by:

$$\text{number of samples} = \text{ShadingRatio} * \text{Estimated Pixel Coverage}$$

The graphics rendering engine 120 selects the series of parameter images such as the parameter images 312 created in FIG. 3 to find the image that closest matches the number of samples specified by the game engine 112.

To start the shading process, the object space engine 206 first sorts the objects (430) for the scene such as the objects 410, 412, 414, and 416 so that objects with similar size and material type will be rendered together. This minimizes shader program state changes while increasing allocation efficiency. Next, the object space engine 206 allocates a region of an image (432) that will capture the shading data of the graphic object for the particular frame of shaded data.

This image may contain shading data from multiple objects, which are stored in different sections of the image. The resulting image may include a variety of objects shaded, and all stored in the same texture. Some of the objects require very few samples, therefore mapping to small regions in the texture, while some objects may require much larger regions.

The object space engine 206 then executes a shader program such as the material shader programs 220 in FIG. 2 for each possible material that might be applied to shade the object (434). Each shading point of each object is evaluated in parallel by the GPU 106 by executing one of the shader programs 220 using the shading parameter images associated with the object. In this example, the CPU renders a quad that aligns to the 2D image of sample points calculated in FIG. 3. An image represents a 2D grid of points to be evaluated. The evaluation may be performed over a simple loop over this 2D grid of points. However, it may be faster to use GPU rasterization hardware to draw two triangles that form a square over the image instead. This is because the exact order of points to be evaluated may be more optimal than a simple loop, and the rasterizer of the GPU has already been optimized to execute in the most optimal order as long as this operation is completed by the rasterization hardware. However, the object rendering may be performed via a computer shader. A computer shader iterates over the data more like a simpler set of loops. Unlike other shading methods, the computer shading requires no specialized graphics hardware, and requires only computing hardware generally suited for high performance floating point and memory calculation such as a parallelized CPU, or Intel MIC Architecture used in products such as the Intel Xeon Phi. The application of the shader programs 220 results in a shaded object image 440.

Normally, for a forward or deferred renderer, the geometry of an object is transformed at a vertex level, and these values are interpolated into the shading samples. In the example processing system 100, every shading point of an object contains corresponding geometry information, and this information is transformed for every shaded sample point, rather than being interpolated from the actual geometry. In this manner, the shading of the object is completely divorced from the processing of the geometry (e.g., vertices and triangles) of the object.

The product of the shading process 402 is a shaded image such as the shaded image 440 in FIG. 4, which contains the lighting information for a single instance of an object during a single frame. This data is stored in a linear color space, such that smaller versions of this image can be accurately calculated. The next step is to calculate a MIP chain (a set of progressively smaller images). Because the data is linear, any standardized linear filtering method such as trilinear filtering may be used. The MIP chain is stored in a hardware friendly format in the video memory 114 for fast compositing.

After shading, the process proceeds to the rasterization process 404 for the desired objects such as the objects 410, 412, 414, and 416, which are now a series of shaded objects 442. After shading, the objects to be rendered such as the objects 410, 412, 414, and 416 have their lighting information captured into a texture. Because shading is separated from rasterization, the graphics rendering engine 120 sends separate commands to shade an object and to rasterize it.

At this point, an object contains a MIP (texture) of the final lighting data. From this, the object is rendered on the screen. Because the shading is independent of geometry, the object will be rendered multiple times per frame (450) using raster module 208 in FIG. 2. This is done to remove geometry and temporal aliasing. For example, a fast moving car will appear blurred because the object will be rendered multiple times according to exposure of the camera. Because the final object contains just a simple set of geometry and a texture, this method makes it efficient to render motion blur.

A graphic object may be rasterized multiple times (440) with the same shade data to accomplish anti-aliasing, motion blurring, and depth of field. Because a frame occurs over a length of time (e.g., 33 ms), it is possible that an object has moved throughout the course of this frame. Therefore, the entire scene is rendered by multiple time points across the frame. For example, the graphics rendering engine 120 may render the scene 32 times, each at one time interval 1 ms apart. This creates a series of intermediate images referred to as interframe renders 452.

For each interframe render of the scene, the positions of the object and the camera are interpolated from the previous set of positions, so that the exact position of the object will not be the same unless neither the camera nor the object is moving. However, even if an object is not moving, each object is offset so that each interframe rendering has a sub pixel movement from the other renders in a random distribution.

In addition to camera movement, a small random offset (less than a pixel) is introduced. This process introduces anti-aliasing, since sub-pixel frequencies should get diluted based on the number of times the object is rendered. Additionally, an object may be brought in and out of focus by multiplying this distribution times a blur amount, which will cause frequencies below the blur amount to be removed. If each object is blurred relative to its distance from a specified focal point, this gives a good approximation of depth of field. Thus, unlike other rendering systems where motion blur, depth of field, and anti-aliasing are performed with separate systems, object space rendering via the rasterization and composting process accomplishes all of these effects simultaneously.

The graphics rendering engine 120 then blends the intermediate frames 452 to produce a final image 460. The final image 460 is stored in the frame buffer of the video memory 114 and is displayed on the video display 104.

The process of separating shading from rasterization employed by the graphics rendering engine 120 run by the processing system 100 has several advantages. It is able to account directly for discontinuities in material shading and correctly anti-alias them. For example, a checkerboard pattern can be built in a material with a simple step function:

```
float4 Checkboard(float2 Tex : TEXCOORD) : SV_OUTPUT
{
    Tex *= 128;
//will cause aliasing in both a forward and deferred renderer, because
// this introduces a frequence in screen space which should not be
in the image
    if(Tex.x % 2 == Tex.y %2)
        return RED;
    else
        return WHITE;
}
```

This shader will cause significant aliasing because a pixel must be either RED or WHITE, even though the image would be better represented, when on a boundary, by a pixel that would fall between these two values. In both forward and deferred rendering, the resulting rendering would have significant aliasing.

Additionally, it is possible to evaluate multiple shading samples per pixel, and not couple the evaluation with the resolution of the final render. This allows the graphics rendering engine 120 to account for shading properties that are not stable under minification.

A simple example of this is an anisotropic surface such as vinyl record. A vinyl record, when viewed too far away for the grooves to be seen, still reflects light anisotropically. In other words, the geometry of the groves must be taken into account for shading, even if the grooves are too small to see from the distance the object is viewed from.

Figure 5:
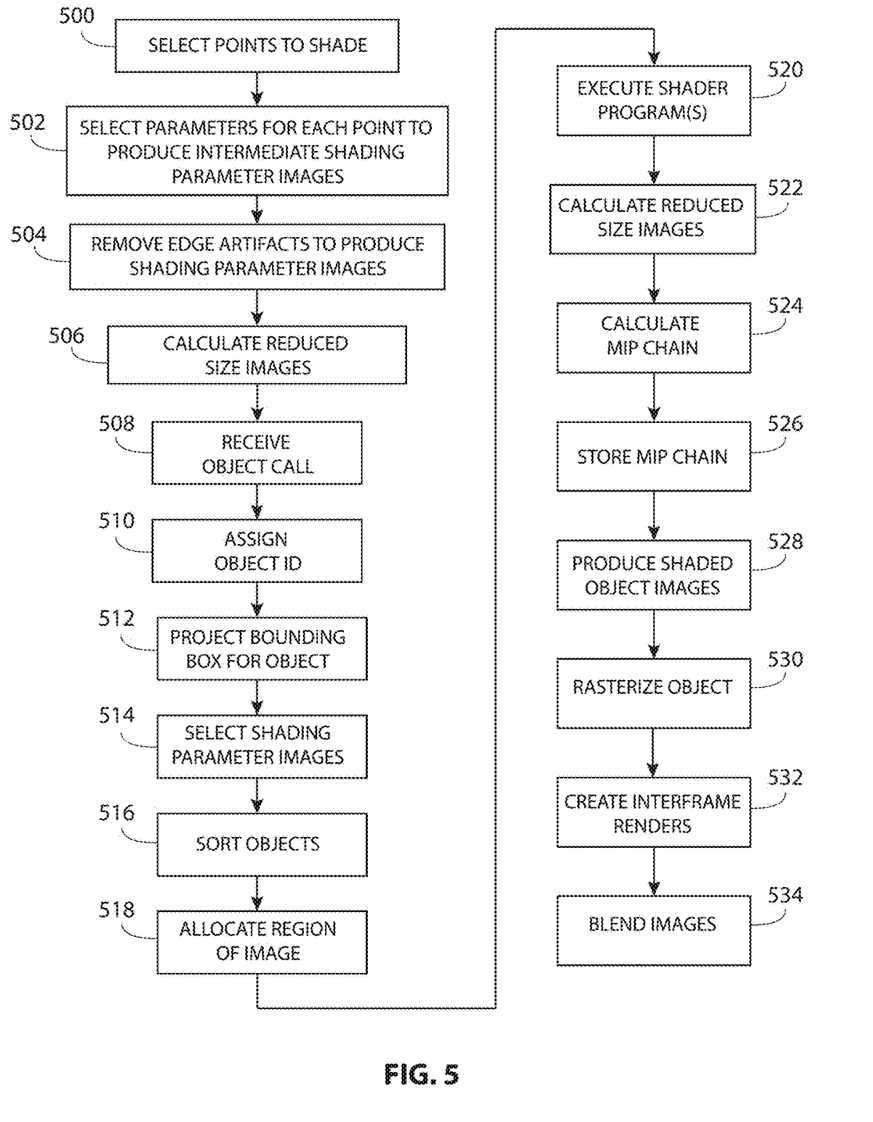
FIG. 5 is a flow diagram of the process used to render graphics by the graphics rendering engine in FIG. 1.

The process of rendering objects that may be controlled on the example processing system 100, will now be described with reference to FIGS. 1-4 in conjunction with the flow diagram shown in FIG. 5. The flow diagram in FIG. 5 is representative of example machine readable instructions for rendering a called object on a display. In this example, the machine readable instructions comprise an algorithm for execution by: (a) a processor, (b) a controller, and/or (c) one or more other suitable processing device(s) such as a GPU. The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 5 may be implemented manually. Further, although the example algorithm is described with reference to the flowcharts illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 is a flow diagram of the process of rendering a graphic object called by an application such as a video game application including the game engine 112. The initial shading parameters are determined for each graphic object. First, a number of points of the graphic object are selected by the graphics rendering engine 120 (500). Shading parameters are selected by the parameter calculation module 202 for the points of the graphic object based on the desired parameters for the graphic object (502). The result is intermediate parameter images for each shading parameter. The intermediate parameter images are processed by the edge fill module 204 to remove edge artifacts (504). The result is a series of parameter images associated with each graphic object. The parameter images may be used to calculate any number of reduced sized images (506). The above steps may be performed in real-time by the graphics rendering engine 120 or they may be performed when the game engine and object data are loaded into the CPU memory 110.

When the game engine 112 calls for a graphic object to be rendered, the call for the graphic object to be rendered is received by the graphics rendering engine 120 (508). The object is assigned an ID for reference by the graphics rendering engine 120 and the game engine 112 (510). The corresponding stored image parameters are selected for the called graphic object from the GPU memory 114 (512). The object is then sorted with other objects by the object space engine 206 (514). The graphics rendering engine 120 projects a bounding box for the object (516). A region of the screen is allocated to the object (518).

The graphic object is then shaded by applying the shading parameters to the required shading programs to produce a shaded object image (520). If required, reduced sized images are calculated for the graphic object (522). A MIP chain is calculated for the reduced sized images (524). The resulting MIP chain is stored (526). The resulting shaded object image is produced with lighting information captured in the texture (528). The object is then rasterized to create an intermediate frame by the rasterizer 208 (530). The interframe renders are produced by the different interframe renders from the rasterizer 208 (532). The interframe renders are then blended to produce a frame for the display (534).

Each of these embodiments and obvious variations thereof is contemplated as falling within the spirit and scope of the claimed invention, which is set forth in the following claims.

What is claimed is:

1. A method for generating a graphic display by decoupling shading from rasterization in a graphic processing system, the method comprising:

for each graphic object of a plurality of graphic objects:
selecting a set of points of a corresponding one of the plurality of graphic objects for shading via a graphic processor unit (GPU), the corresponding one of the plurality of graphic objects being represented as a mesh in object space;
determining at least one shading parameter for application to the selected set of points of the corresponding one of the plurality of graphic objects via the GPU;
precalculating a shading parameter image based on the determined at least one shading parameter via the GPU;
storing the shading parameter image in a memory of the GPU;
sorting the plurality of graphic objects to minimize state changes of a shader program and allocating an image space in the memory of the GPU for the plurality of graphic objects;
shading, with the shader program, the selected set of points of the mesh representing the corresponding one of the plurality of graphic objects according to a sorting order of the plurality of graphic objects using the shading parameter image to produce a shaded mesh having corresponding shaded object space values;
anti-aliasing the shading of the shaded mesh by calculating a MIP chain of the shaded mesh; and
rasterizing, by the GPU, the MIP chain of the shaded mesh to produce a geometric representation of the shaded mesh for a frame image, the rasterizing of the MIP chain of the shaded mesh including mapping the corresponding shaded object space values of the MIP chain of the shaded mesh to corresponding pixels of the frame image allocated in the image space for the corresponding one of the plurality of graphic objects.

2. The method of claim 1, wherein the shading parameter image is stored for other instances of the corresponding one of the plurality of graphic objects.

3. The method of claim 1, wherein the sorting includes grouping the corresponding one of the plurality of graphic objects with other graphic objects of similar size and material type prior to the shading.

4. The method of claim 1, wherein a plurality of reduced sized images is assigned to the corresponding one of the plurality of graphics object based on an estimated pixel coverage of the corresponding one of the plurality of graphic objects.

5. The method of claim 1, wherein the shading parameter image is selected from at least one of the group of an artist created texture, the geometry of the object, position, normal, ambient occlusion, weathering, color, surface roughness, directional occlusion, and Bidirectional Reflection Distribution Function parameters.

6. The method of claim 5, wherein the shading parameter image is produced by edge filling an intermediate parameter image.

7. The method of claim 1, wherein the shading parameter image is created in a format for execution by a graphics processing unit.

8. The method of claim 1, wherein the shading for the corresponding one of the plurality of graphic objects includes a range from undershading to overshading.

9. The method of claim 1, wherein the precalculating occurs when a game engine is loaded for execution and prior to calling the corresponding one of the plurality of graphic objects.

10. The method of claim 1, further comprising:
rasterizing a plurality of interframe renders including the frame image, each including the corresponding shaded object space values;
blending the plurality of interframe renders to produce a blended frame image;
loading the blended frame image into a frame buffer; and
displaying the blended frame image on a display.

11. The method of claim 1, wherein the corresponding one of the plurality of graphic objects is shaded in object space.

12. A graphic rendering system for decoupling shading from rasterization of a graphic object, the system comprising:
a memory of a graphic processing unit (GPU), the memory storing a plurality of graphic objects, each of the plurality of graphic objects including a set of points, each of the plurality of graphic objects being represented as a mesh in object space; and
one or more processors coupled to the memory of the GPU, at least one of the one or more processors being operable to:
for each graphic object of the plurality of graphic objects:
select a set of points of a corresponding one of the plurality of graphic objects for shading via the GPU;
determine at least one shading parameter for application to the selected set of points of the corresponding one of the plurality of graphic objects via the GPU;
precalculate a shading parameter image based on the determined at least one shading parameter via the GPU;
store the shading parameter image in the memory of the GPU;
sort the plurality of graphic objects to minimize state changes of a shader program and allocate an image space in the memory of the GPU for the plurality of graphic objects;
shade, with the shader program, the selected set of points of the mesh representing the corresponding one of the plurality of graphic objects according to a sorting order of the plurality of graphic objects using the shading parameter image to produce a shaded mesh having corresponding shaded object space values;
anti-alias the shading of the shaded mesh by calculating a MIP chain of the shaded mesh; and
rasterize, by the GPU, the MIP chain of the shaded mesh to produce a geometric representation of the shaded mesh for a frame image, the rasterizing of the MIP chain of the shaded mesh including mapping the corresponding shaded object space values of the MIP chain of the shaded mesh to corresponding pixels of the frame image allocated in the image space for the corresponding one of the plurality of graphic objects.

13. The system of claim 12, wherein the shading parameter image is stored for other instances of the corresponding one of the plurality of graphic objects.

14. The system of claim 12, wherein the corresponding one of the plurality of graphic objects is sorted by being grouped with other graphic objects of similar size and material type prior to shading.

15. The system of claim 12, wherein a plurality of reduced sized images is assigned to the corresponding one of the plurality of graphic objects based on an estimated pixel coverage of the corresponding one of the plurality of graphic objects.

16. The system of claim 12, wherein the shading parameter image is selected from at least one of the group of an artist created texture, the geometry of the object, position, normal, ambient occlusion, weathering, color, surface roughness, directional occlusion, and Bidirectional Reflection Distribution Function parameters.

17. The system of claim 16, wherein the shading parameter image is produced by edge filling an intermediate parameter image.

18. The system of claim 12, wherein the shading parameter image is created in a format for execution by the GPU.

19. The system of claim 12, wherein the shading for the corresponding one of the plurality of graphic objects includes a range from undershading to overshading.

20. The system of claim 12, wherein the precalculating occurs when a game engine is loaded for execution and prior to calling the corresponding one of the plurality of graphic objects.

21. The system of claim 12, wherein the graphics rendering engine is further operable to:
rasterize a plurality of interframe renders including the frame image, each including the corresponding shaded object space values;
blend the plurality of interframe renders to produce a blended frame image;
load the blended frame image into a frame buffer; and
display the blended frame image on a display.

22. The system of claim 12, wherein the object space includes a texture space.

23. A non-transitory, machine readable medium having stored thereon instructions for rendering a graphic object for display, the stored instructions comprising machine executable code, which when executed by at least one machine processor, causes the machine processor to:
for each graphic object of a plurality of graphic objects:
select a set of points of a corresponding one of the plurality of graphic objects for shading, the corresponding one of the graphic objects being represented as a mesh on object space;
determine at least one shading parameter for application to the selected set of points of the corresponding one of the plurality of graphic objects;

precalculate a shading parameter image based on the determined at least one shading parameter;

store the shading parameter image in a memory of a graphic processing unit (GPU);

sort the plurality of graphic objects to minimize state changes of a shader program and allocate an image space in the memory of the GPU for the plurality of graphic objects;

shade, with the shader program, the selected set of points of the mesh representing the corresponding one of the plurality of graphic objects according to a sorting order of the plurality of graphic objects using the shading parameter image to produce a shaded mesh having corresponding shaded object space values;

anti-alias the shading of the shaded mesh by calculating a MIP chain of the shaded mesh; and rasterize, by the GPU, the MIP chain of the shaded mesh to produce a geometric representation of the shaded mesh for a frame image, the rasterizing of the MIP chain of the shaded mesh including mapping the corresponding shaded object space values of the MIP chain of the shaded mesh to corresponding pixels of the frame image allocated in the image space for the corresponding one of the plurality of graphic objects.

* * * * *